(12) United States Patent
Jung et al.

(10) Patent No.: US 11,237,427 B2
(45) Date of Patent: Feb. 1, 2022

(54) INK COMPOSITION FOR REFLECTIVE SHEET, DISPLAY APPARATUS INCLUDING THE SAME AND METHOD OF MANUFACTURING DISPLAY APPARATUS

(71) Applicant: SAMSUNG ELECTRONICS CO., LTD., Suwon-si (KR)

(72) Inventors: Il Yong Jung, Yongin-si (KR); Young Chul Lee, Hwaseong-si (KR); Jong Bin Kim, Suwon-si (KR); Jong Pil Jeon, Suwon-si (KR); Byoung-Jin Cho, Anyang-si (KR); Jean Hur, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 16/760,511

(22) PCT Filed: Oct. 5, 2018

(86) PCT No.: PCT/KR2018/011794
§ 371 (c)(1),
(2) Date: Apr. 30, 2020

(87) PCT Pub. No.: WO2019/103308
PCT Pub. Date: May 31, 2019

(65) Prior Publication Data
US 2021/0200029 A1    Jul. 1, 2021

(30) Foreign Application Priority Data
Nov. 21, 2017  (KR) .......................... 10-2017-0155831

(51) Int. Cl.
*G02F 1/13357*    (2006.01)
*C09D 11/101*    (2014.01)
(Continued)

(52) U.S. Cl.
CPC ...... *G02F 1/133605* (2013.01); *C09D 11/101* (2013.01); *C09D 11/107* (2013.01);
(Continued)

(58) Field of Classification Search
CPC ....................... G02F 1/133605; G02F 2203/02
See application file for complete search history.

(56) References Cited

U.S. PATENT DOCUMENTS

2013/0321742 A1    12/2013 Yankov et al.

FOREIGN PATENT DOCUMENTS

| JP | 10-62781 A | 3/1998 |
|---|---|---|
| JP | 2009-223312 A | 10/2009 |

(Continued)

OTHER PUBLICATIONS

Communication (PCT/ISA/210) dated Jan. 28, 2019 by the International Searching Authority in counterpart international Patent Application No. PCT/KR2018/011794.
(Continued)

*Primary Examiner* — Vip Patel
(74) *Attorney, Agent, or Firm* — Sughrue Mion, PLLC (57) ABSTRACT

The disclosed embodiments relate to an ink composition for reflective sheet capable of preventing a luminance difference occurring at an upper or lower end of a display panel and display apparatus including the same and method of manufacturing the display apparatus.

The display apparatus of the disclosed embodiment comprises a display panel to display an image, a light source configured to supply light to the display panel, a light guide plate configured to guide light emitted from the light source, a reflective sheet movable between a first state close to the lower surface of the light guide plate and a second state farther away from the lower surface of the light guide plate than the first state, and a reflective pattern provided on the
(Continued)

reflective sheet and configured to be disposed in contact with the light guide plate in the first state, wherein the reflective pattern on the reflective sheet is formed of an acrylate resin including a multi-functional acrylate monomer.

8 Claims, 11 Drawing Sheets

(51) Int. Cl.
  *C09D 11/107* (2014.01)
  *F21V 8/00* (2006.01)
(52) U.S. Cl.
  CPC ...... *G02B 6/0055* (2013.01); *G02F 2202/023* (2013.01); *G02F 2203/02* (2013.01)

(56) References Cited

FOREIGN PATENT DOCUMENTS

| | | |
|---|---|---|
| JP | 2017-524561 A | 8/2017 |
| KR | 10-1158691 B1 | 6/2012 |

OTHER PUBLICATIONS

Communication (PCT/ISA/237) dated Jan. 28, 2019 by the International Searching Authority in counterpart international Patent Application No. PCT/KR2018/011794.

INK COMPOSITION FOR REFLECTIVE SHEET, DISPLAY APPARATUS INCLUDING THE SAME AND METHOD OF MANUFACTURING DISPLAY APPARATUS

TECHNICAL FIELD

Embodiments of the present disclosure relate to an ink composition for a reflective sheet, a display apparatus including the same, and a method of manufacturing the display apparatus, and more particularly, to an ink composition for a reflective sheet having an improved structure to prevent loss of light emitted from a light source, a display apparatus including the same, and a method of manufacturing the display apparatus.

BACKGROUND ART

Generally, a display apparatus is an apparatus configured to display a screen, and includes, for example, a monitor or a television. The display apparatus may be provided with an emissive display panel such as an organic light-emitting diode (OLED) or a non-emissive display panel such as a liquid crystal display (LCD) panel.

The present disclosure relates to a non-emissive display panel, including a display panel formed of a liquid crystal display panel to display a screen, and a backlight unit disposed on a rear side of the display panel.

The backlight unit includes a light emitting diode module, which is a light source, to provide light to the display panel. There is a problem in that light is leaked from the upper or lower end of the display panel due to the location of the light source on one side of the display panel. Therefore, a problem of a luminance difference occurs.

DISCLOSURE

Technical Problem

It is an aspect of the present disclosure to provide an ink composition for a reflective sheet, a display apparatus, and a method of manufacturing the display apparatus capable of preventing a luminance difference of the upper or lower end of a display panel.

Technical Solution

In accordance with one aspect of the present disclosure, a display apparatus includes: a display panel to display an image; a light source configured to supply light to the display panel; a light guide plate configured to guide light emitted from the light source; a reflective sheet movable between a first state close to the lower surface of the light guide plate and a second state farther away from the lower surface of the light guide plate than the first state; and a reflective pattern provided on the reflective sheet and configured to be disposed in contact with the light guide plate in the first state, wherein the reflective pattern on the reflective sheet is formed of an acrylate resin including a multi-functional group acrylate monomer.

The multi-functional acrylate monomer may be 3 to 5 wt % based on the total weight of the acrylate resin.

The multi-functional acrylate monomer may be one element selected from a group consisting of a hydroxyethyl acrylate group, a hydroxyl propyl methacrylate group, and a melamine group.

The display apparatus may further include a reflective sheet driving unit configured to move the reflective sheet from the first state to the second state.

The reflective sheet driving unit may include a contact member in contact with the reflective sheet, and a moving member configured to move the contact member to move the reflective sheet.

A refractive index of the reflective pattern may be 1.49.

The display apparatus may further include a backlight unit including the reflective sheet and the light source, and a middle mold configured to support the display panel.

The backlight unit may further include a printed circuit board on which the light source is mounted and a plurality of optical sheets disposed on a lower portion of the display panel.

In accordance with another aspect of the present disclosure, an ink composition for reflective sheet applied to a reflective sheet of a display device includes: a multi-functional acrylate monomer, a multi-functional group of the multi-functional acrylate monomer is one element selected from a group consisting of a hydroxyethyl acrylate group, a hydroxyl propyl methacrylate group, and a melamine group.

The multi-functional acrylate monomer may be 3 to 5 wt % based on the total weight of the ink composition.

The ink composition for reflective sheet may have a viscosity of 7000±500 cps and is a transparent material.

In accordance with another aspect of the present disclosure, a method of manufacturing a display apparatus including a light source and a reflective sheet to reflect light irradiated from the light source includes: preparing a composition including a multi-functional acrylate monomer on a printing plate; performing silk screen printing on the reflective sheet using a squeegee; curing the composition by irradiating UV light; and drying.

The multi-functional acrylate monomer may be 3 to 5 wt % based on the total weight of the ink composition.

The multi-functional group of the multi-functional acrylate monomer may be one element selected from a group consisting of a hydroxyethyl acrylate group, a hydroxyl propyl methacrylate group, and a melamine group.

The curing may be cured by irradiating UV light of 300 mJ to 500 mJ.

Advantageous Effects

The luminance difference can be prevented by minimizing the light loss occurring at the upper or lower end of the display panel.

BEST MODE

Configurations illustrated in the embodiments and the drawings described in the present specification are only examples, and thus it is to be understood that various modified examples, which may replace the embodiments and the drawings described in the present specification, are possible when filing the present application.

Also, like reference numerals or symbols provided in the drawings of the present specification represent members or components that perform substantially the same functions.

The terms used in the present specification are used to describe the example embodiments. Accordingly, it should be apparent to those skilled in the art that the following description of example embodiments is provided for illustration purposes only and not for the purpose of limiting the invention as defined by the appended claims and their equivalents. It is to be understood that the singular forms "a," "an," and "the" include plural referents unless the context clearly dictates otherwise. It will be understood that when the terms "includes," "comprises," "including," and/or "comprising" when used in this specification, specify the presence of stated features, figures, operations, components, or combination thereof, but do not preclude the presence or addition of one or more other features, figures, steps, components, members, or combinations thereof.

Also, it will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, example embodiments will be described in detail with reference to the accompanying drawings.

Figure 1:
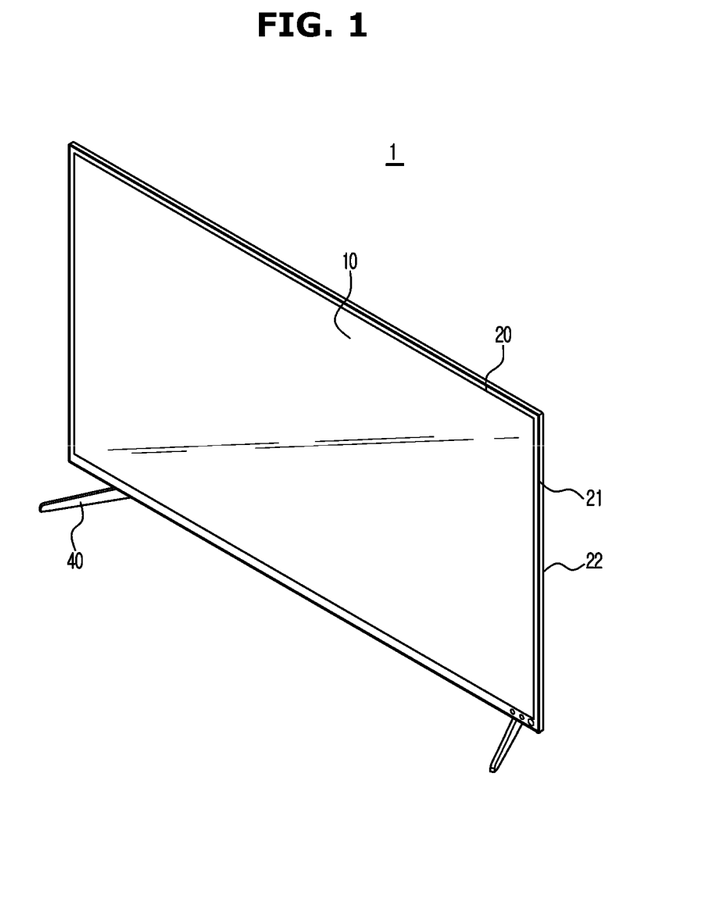
FIG. 1 shows a display apparatus according to an embodiment.
Figure 2:
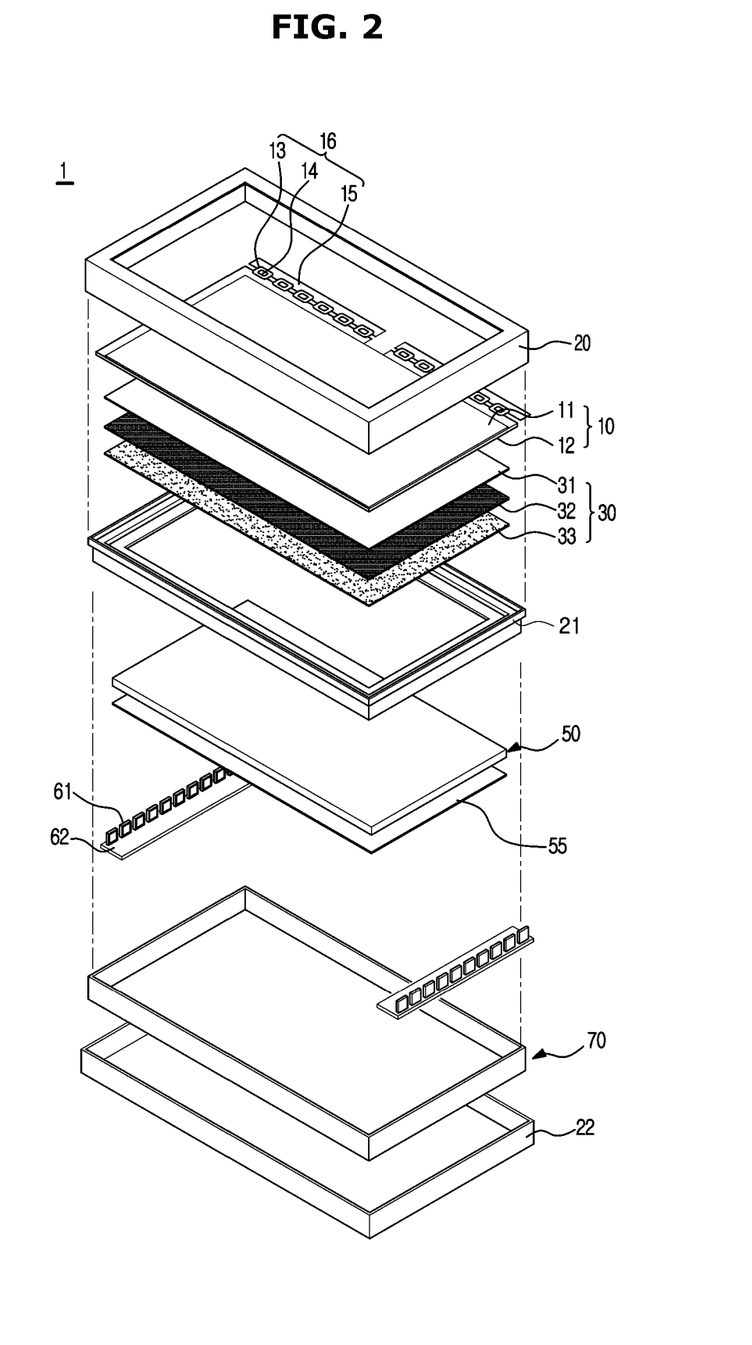
FIG. 2 shows an exploded view of the display apparatus according to an embodiment.

FIG. 1 shows a display apparatus according to an embodiment, and FIG. 2 shows an exploded view of the display apparatus according to an embodiment.

For convenience of explanation, a display apparatus 1 shown in FIGS. 1 and 2 is assumed to be a flat panel display apparatus, however the display apparatus 1 may be a curved display apparatus or a flexible (or bendable) display apparatus.

Although the present invention has been described with reference to a flat panel display apparatus as an example, the display apparatus 1 is not limited to a flat panel display apparatus but may be a curved display panel apparatus having a screen with a fixed curvature, a bended panel display apparatus having a screen with a fixed curvature, or a curvature variable panel display apparatus capable of changing the curvature of the current screen by user input. And, it will readily be understood by those of ordinary skill in the art.

Shown in FIG. 1 and FIG. 2, the display apparatus 1 may include a display panel 10 and a backlight unit to irradiate the light to the display panel 10. The backlight unit may be disposed so as to be spaced behind the display panel 10.

The display apparatus 1 may include the display panel 10, a middle mold 21 to support the display panel 10 and the backlight unit, a top chassis 20 disposed on the front surface of the display panel 10, a bottom chassis 70 disposed at the rear of the display panel 10 and a rear cover 22 disposed at the rear of the bottom chassis 70 to form a rear outer appearance of the display device 1.

In an embodiment of the disclosure, a separate backlight unit is included, and the display panel 10 is a liquid crystal display (LCD) having a non-emissive display panel.

The display apparatus 1 may include therein a display module for displaying an image. The display module is formed from the top chassis 20 to the bottom chassis 70 and the rear cover 22 is coupled to the display module to complete the display apparatus 1. A front cover, not shown in the figure, may be coupled to the front of the top chassis 20 to form the front appearance of the display apparatus 1.

The display module may include the display panel 10 on which an image is displayed, and the backlight unit that supplies light to the display panel 10. The backlight unit may include a light guide plate 50 disposed below the display panel 10, a reflective sheet 55 configured to contact the lower surface of the light guide plate 50, and a light source 61. The backlight unit may include a plurality of optical sheets 30 disposed at a lower portion of the display panel 10, the light guide plate 50 disposed at a lower portion of the optical sheet 30, the light source 61 for supplying light to the light guide plate 50 and a printed circuit board 62 on which the light source 61 is mounted.

The optical sheet 30 may include a protective film 31, a prism film 32, and a diffusion film 33.

The protective film 31 is disposed on the top of the prism film 32 to protect the prism film 32 that is sensitive to scratches such as from dust.

The prism film 32 is formed with a triangular columnar prism on the upper surface so as to condense the light diffused in the diffusion film 33 in a direction perpendicular to the plane of the upper display panel 10. Normally, two of the prism films 32 are used, and the micro prisms formed in the respective prism films 32 form a predetermined angle. Most of the light passing through the prism film 32 advances vertically to provide a uniform latitude distribution.

The diffusion film 33 is formed with a bead-like coating layer on the base plate so as to diffuse the light from the light guide plate 50 and supply the light to the display panel 10.

The light guide plate 50 is made of an acrylic resin such as polymethylmethacrylate (PMMA) or polymethylstyrene, and uniformly supplies the light emitted from the light source 61 to the diffusion film 33. The light guide plate 50 may include an incident surface provided on the side surface so as to allow the light emitted from the light source 61 to be incident, an emission surface facing the diffusion film 33 and a reflection surface provided parallel to the emission surface. According to an embodiment of the disclosure, the reflective sheet 55 is movable between a first state close to the lower surface of the light guide plate 50 and a second state distant from the lower surface of the light guide plate 50. This will be described later. Also, a reflective pattern 55a provided in contact with the light guide plate 50 at the first state may be provided on the reflective sheet 55 in one state. This will be described later.

The light source 61, which emits light, may be mounted on the printed circuit board 62. The printed circuit board 62 applies an electrical signal to the light source 61. The light source 61 may be provided with a plurality of light emitting diodes.

In an embodiment of the disclosure, the printed circuit board 62 is provided on the left and right edges of the bottom chassis 70.

The light source 61 may be mounted on one surface of the printed circuit board 62 in a direction projecting forward. The light source 61 may be spaced apart from each other in a longitudinal direction of the printed circuit board 62. The light source 61 irradiates light in a direction perpendicular to the direction in which the light source 61 protrudes from the printed circuit board 62.

The rear surface of the surface on which the light source 61 is mounted on the printed circuit board 62 is disposed toward the bottom of the bottom chassis 70.

The light source 61 may include a plurality of light emitting diodes that emit white light, or a combination of a plurality of light emitting diodes that emit red, green, and blue light.

The display panel 10 may include a thin film transistor substrate 12 on which a thin film transistor is formed, a color filter substrate 11 facing the thin film transistor substrate 12, and a liquid crystal layer (not shown) provided between the thin film transistor substrate 12 and the color filter substrate 11.

A driving unit 16 for applying a driving signal may be provided on one side of the thin film transistor substrate 12. The driving unit 16 may include a flexible circuit board 13, a driving chip 14 mounted on the flexible circuit board 13 and a circuit board 15 connected to the other side of the flexible circuit board 13. The flexible circuit board 13 is a chip on film (COF) type in which a chip device is mounted on a base film. However, the present disclosure is not limited thereto, and may be a tape carrier package (TCP) using TAP (Tape Automated Bonding) or a chip on glass (COG).

As described above, the display panel 10 according to the present exemplary embodiment is a liquid crystal display panel that forms a screen by adjusting the arrangement of liquid crystal layers. Since it is a non-light emitting device, it is necessary to receive light from the backlight unit located on the back surface to display an image.

The top chassis 20 may include a bezel that wraps around the edge of the display panel 10 and a top side that is bent at an end of the bezel. An opening is formed on the front surface of the top chassis 20 so that the effective area in which the screen is actually displayed on the display panel 10 is exposed to the front side.

The backlight unit including the printed circuit board 62, the middle mold 21, the optical sheet 30 and the display panel 10 are seated and disposed in this order in the bottom chassis 70. The top chassis 20 is coupled in front of the bottom chassis 70 to form one display module. When the rear cover 22 is coupled to the display module, the display apparatus 1 is completed.

Figure 3:
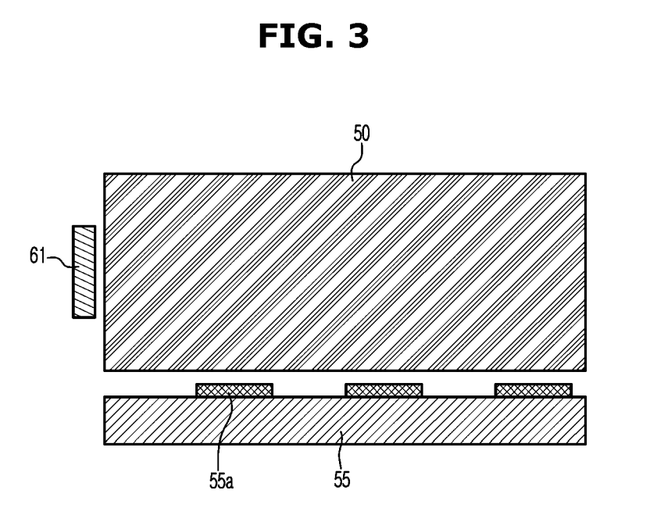
FIG. 3 shows a schematic view illustrating a light guide plate, a reflective sheet, and a light source of a display apparatus according to an embodiment.

FIG. 3 shows a schematic view illustrating a light guide plate, a reflective sheet, and a light source of a display apparatus according to an embodiment.

As shown in FIG. 3, the reflective sheet 55 is provided close to the lower surface of the light guide plate 50. The reflective pattern 55a is provided on the reflective sheet 55 and the reflective pattern 55a may be formed of an acrylate resin including a multi-functional acrylate monomer. The reflective pattern 55a on the reflective sheet 55 is configured to contact the light guide plate 50 in the first state.

The reflective pattern 55a is disposed at a lower portion of the light guide plate 50 and guides the light emitted through the lower surface of the light guide plate 50 to the light guide plate 50 again. The reflective pattern 55a may be formed of a transparent material. Also, the reflective pattern 55a may have a refractive index of 1.49. This is because the light guide plate 50 and the reflective pattern 55a must have the same refractive index to cause light emission well.

Further, the reflective pattern 55a should be adhesive. This is because the light guide plate 50 and the reflective sheet 55 must be in close contact with each other and an air gap between the light guide plate 50 and the reflective sheet 55 must be absent. However, when the reflective pattern 55a appears on the light guide plate 50 in the first state in which the reflective pattern 55a contacts the light guide plate 50, there may be a change in the visibility according to the first state and the second state. Therefore, the reflective pattern 55a should not have a property of being imbedded.

In addition, since the reflective pattern 55a has to be printed on the reflective sheet 55, it is necessary to have a viscosity higher than a certain level. For example, the reflective pattern 55a of the disclosure may have a viscosity of 7000±500 cps.

Further, the reflective pattern 55a may be capable of curing through UV. Since the reflective pattern 55a should not be visible from the outside, it may be made of a transparent material.

The light source 61 may be arranged to face the other surface of the light guide plate 50. The light guide plate 50 is configured to guide the light emitted from the light source 61 to the display panel 10.

The movement of the reflective sheet 55 and the moving direction of the light emitted from the light source 61 will be described later.

Figure 4:
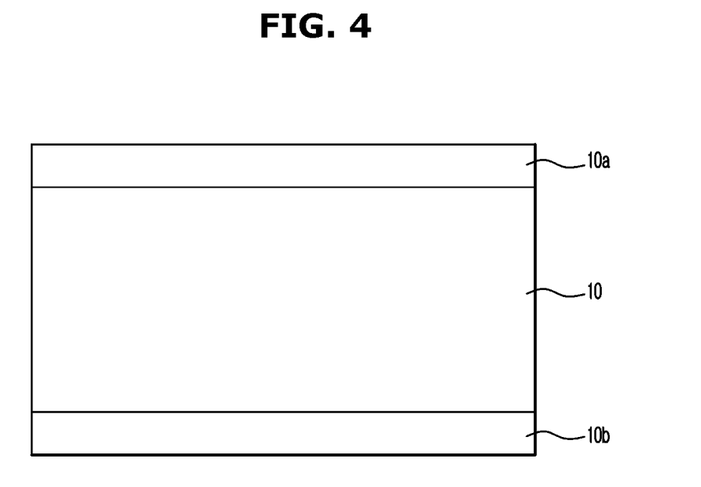
FIG. 4 shows a front view of a display panel in a first mode according to an embodiment.
Figure 5:
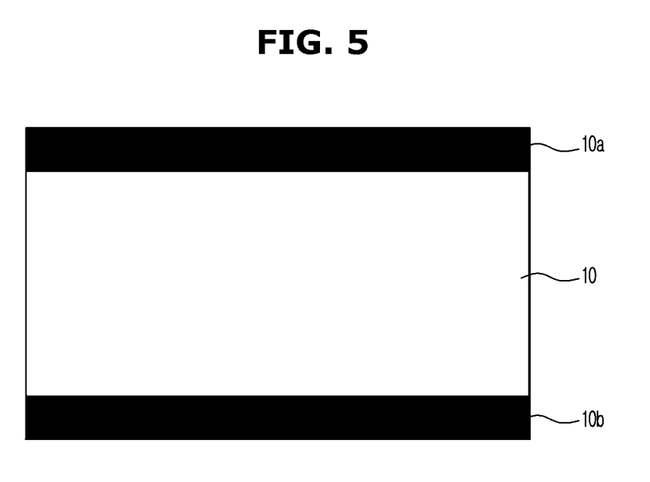
FIG. 5 shows a front view of a display panel in a second mode according to an embodiment.

FIG. 4 shows a front view of a display panel in a first mode according to an embodiment, and FIG. 5 shows a front view of a display panel in a second mode according to an embodiment.

As shown in FIG. 4 and FIG. 5, the display apparatus 1 of the disclosure may have the first mode and the second mode. The first mode is a case in which the screen ratio of the display apparatus 1 is 16:9, and is a screen for general viewing. A separate image different from the central part of the display apparatus 1 is not displayed on upper and lower lines 10a and 10b of the display apparatus 1 in the first mode, but an image displayed in the center portion is displayed on the upper and lower lines 10a and 10b of the display apparatus 1. The second mode is a case in which the screen ratio of the display apparatus 1 is 4:3. In the second mode, letter boxes are formed in the upper and lower lines 10a and 10b of the screen of the display apparatus 1. Subtitles may be displayed in letter boxes, but are not limited thereto.

Conventionally, when the light emitted from the light source reaches the center of the screen of the display apparatus 1 through the letter box, light leaks from the letter box and the light is not uniformly irradiated to the entire screen. Therefore, the luminance is lowered.

Figure 6:
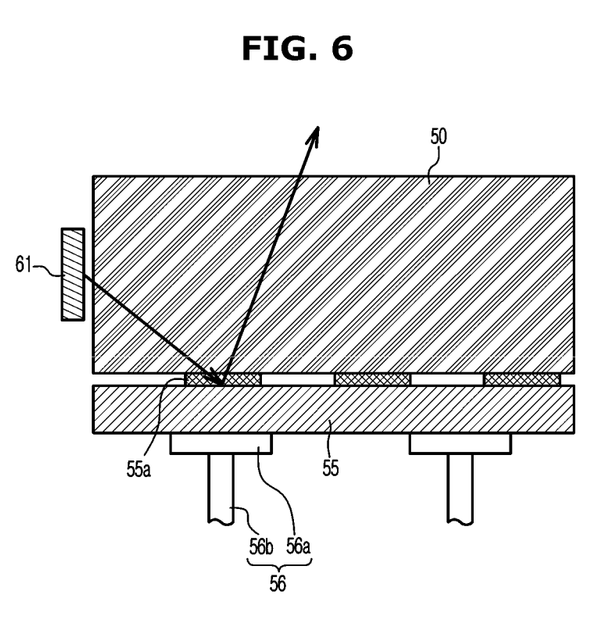
FIG. 6 shows a moving direction of light in a first state according to an embodiment.
Figure 7:
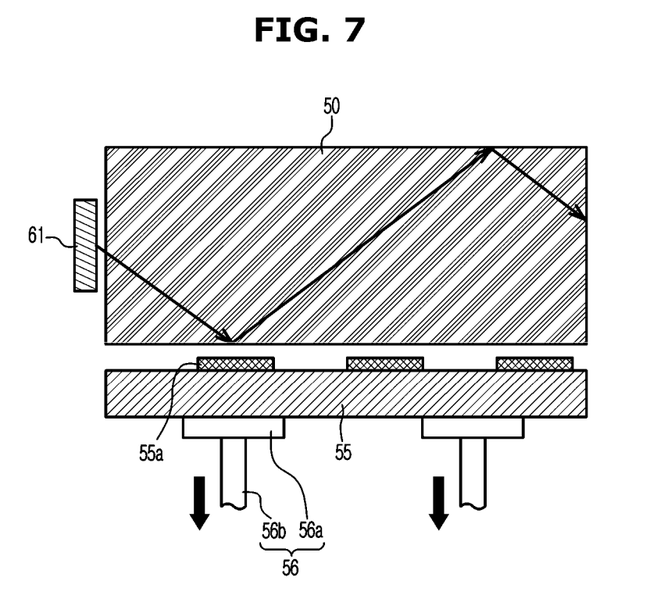
FIG. 7 shows a moving direction of light in a second state according to an embodiment.

FIG. 6 shows a moving direction of light in a first state according to an embodiment, and FIG. 7 shows a moving direction of light in a second state according to an embodiment.

As shown in FIG. 6 and FIG. 7, the reflective sheet 55 can be moved from the first state to the second state or from the second state to the first state by a reflective sheet drive unit 56. The reflective sheet drive unit 56 may include a contact member 56*a* that is in contact with the reflective sheet 55 and a moving member 56*b* that moves the reflective sheet 55 by moving the contact member 56*a*. For example, a driving device such as a motor may be connected to the moving member 56*b* to drive the moving member 56*b*, but it is also not limited thereto. It is also possible to move only a part of the reflective sheet 55 to the first state or the second state by using the reflective sheet drive unit 56.

As shown in FIG. 6, the reflective pattern 55*a* on the reflective sheet 55 in the first state can be attached to the light guide plate 50 because of the adhesive property. The light emitted from the light source 61 reaches the reflective sheet 55 and is not totally reflected. As a result, the light can reach the central portion of the screen of the display apparatus 1, and the lowering of the luminance can be prevented.

As shown in FIG. 7, in the second state, the reflective pattern 55*a* on the reflective sheet 55 and the light guide plate 50 may be spaced apart from each other. Accordingly, the light emitted from the light source 61 is totally reflected, and the light moves inside the light guide plate 50.

The first state and the second state can be adjusted by the reflective sheet driving unit 56. When it is desired to partially increase the luminance by moving the reflective sheet 55, the reflective sheet 55 is moved to the first state using the reflective sheet driving unit 56 in which the reflective pattern 55*a* of the reflective sheet 55 is attached to the light guide plate 50. When it is desired to partially lower the luminance, the reflective sheet 55 is converted so that the reflective pattern 55*a* of the reflective sheet 55 and the light guide plate 50 are spaced apart from each other by the reflective sheet driving unit 56.

According to one embodiment, the reflective pattern 55*a* on the reflective sheet 55 may be formed of an acrylate resin containing a multi-functional acrylate monomer. The multi-functional acrylate monomer may be contained in an amount of 3 to 5% by weight based on the total weight of the acrylate resin.

The multi-functional group of the multi-functional acrylate monomer may be one of a hydroxyethyl acrylate group, a hydroxypropyl methacrylate group, and a melamine group. It is possible to solve the problem of the reflective pattern 55*a* appearing on the light guide plate 50 because the number of crosslinks is increased due to the multi-functional acrylate monomer. In the case that the reflection pattern 55*a* appears on the light guide plate 50, since the reflection difference of the light output due to the conversion between the first state and the second state can be reduced, the luminance uniformity resulting from the conversion between the first state and the second state can be reduce. Therefore, it is necessary to prevent appearing of the reflective pattern 55*a* on the light guide plate 50. In an embodiment, since the number of crosslinks can be increased because 3 to 5% by weight of the multi-functional acrylate monomer is contained in the ink composition for a reflective sheet, the reflective pattern 55*a* appearing on the light guide plate 50 can be prevented.

The manufacture of the display apparatus 1 including the reflective sheet 55 according to an embodiment includes preparing a multi-functional acrylate monomer composition on a printing plate, performing silk screen printing on the reflective sheet using a squeegee, curing the composition by irradiating UV light, and drying. Here, the curing of the ink composition can be cured by irradiation with UV light of 300 mJ to 500 mJ. Accordingly, the reflective sheet 55 including the reflective pattern 55*a* can be manufactured.

Experiments on whether or not the reflective pattern 55*a* is applied to the light guide plate 50 when the reflective sheet 55 coated with the reflective pattern 55*a* according to an embodiment is in contact with the light guide plate 50 will be described below.

Figure 8:
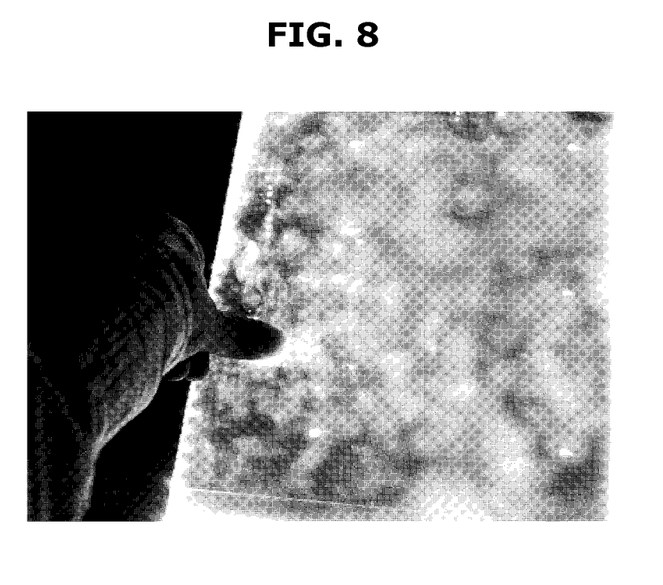
FIG. 8 is a photograph for showing whether or not a reflective pattern formed by a comparative example appears on a light guide plate.
Figure 9:
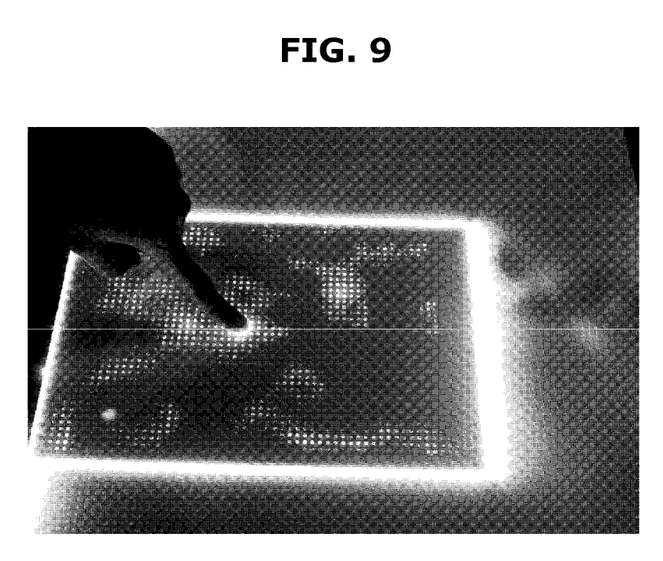
FIG. 9 is a photograph for showing whether or not a reflective pattern formed according to a disclosed exemplary embodiment appears on the light guide plate.

FIG. 8 is a photograph for showing whether or not a reflective pattern formed by a comparative example appears on a light guide plate, and FIG. 9 is a photograph for showing whether or not a reflective pattern formed according to a disclosed exemplary embodiment appears on the light guide plate.

In the case of the comparative example used in FIG. 8, acrylate ink was used as a reflective pattern, the ink viscosity was 7200 cps, and the curing condition was included curing three times for 9 seconds at 900 mJ.

In the case of the disclosed exemplary embodiment used in FIG. 9, acrylate ink containing 5% by weight of a multi-functional acrylate monomer based on the total weight of the acrylate resin is used as a reflective pattern. The ink viscosity was 7200 cps, the curing condition was included curing three times for 9 seconds at 900 mJ.

As shown in FIG. 8, when the multi-functional group acrylate monomer is not contained in the acrylate ink, it is confirmed that the reflective pattern 55*a* is appeared in the light guide plate 50 and light leaks out. In this case, the luminance is lowered.

As shown in FIG. 9, when the multi-functional group acrylate monomer is included in the acrylate ink according to an embodiment, the appearance of the reflective pattern 55*a* on the light guide plate 50 is reduced. As described above, according to the embodiment, the amount of the crosslink is increased due to the multi-functional group acrylate monomer, so that the appearance of the reflective pattern 55*a* on the light guide plate 50 can be prevented.

Figure 10:
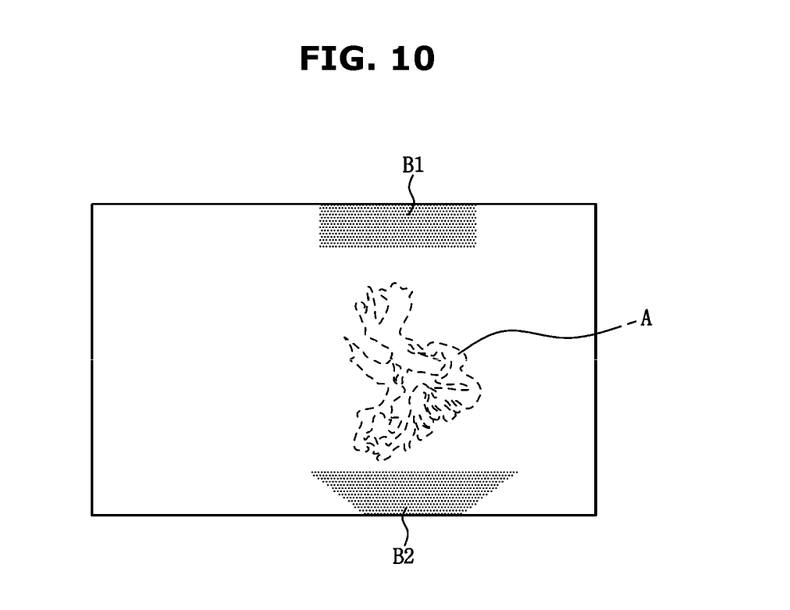
FIG. 10 shows a schematic view illustrating an image displayed on a display panel according to a comparative example.
Figure 11:
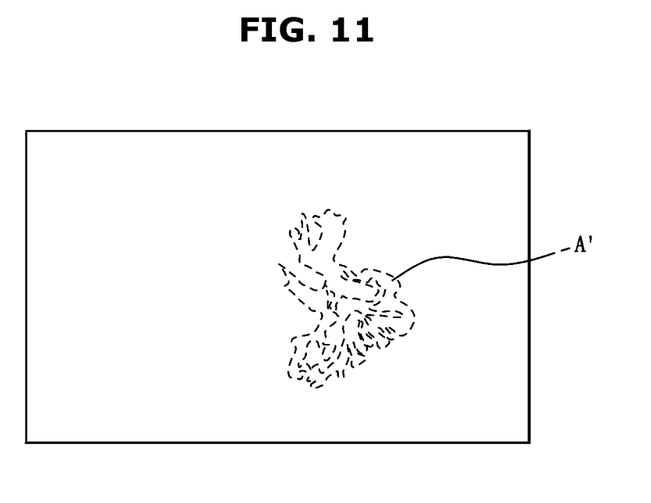
FIG. 11 shows a schematic view illustrating an image displayed on a display panel according to a disclosed exemplary embodiment appearing on the light guide plate.

FIG. 10 shows a schematic view illustrating an image displayed on a display panel according to a comparative example, and FIG. 11 shows a schematic view illustrating an image displayed on a display panel according to a disclosed exemplary embodiment appearing on the light guide plate.

In FIG. 10, it can be confirmed that shadows B1 and B2 are generated at the top and bottom of the screen in addition to image A displayed on the display panel when the light guide plate 50 and the reflective sheet 55 are attached. This is because the light emitted from the light source 61 leaks and shadows are generated.

In FIG. 11, it can be confirmed that only the image A' displayed on the display panel is displayed, and no shade is generated as shown in FIG. 10. In the case of FIG. 11, the reflective sheet 55 is separated from the light guide plate 50 for the part that desires to lower the luminance, so as to cause the light emitted from the light source 61 to be totally reflected by the light guide plate 50 to be emitted from the light source 61. By using the reflective sheet of the disclosure, it is possible to prevent light from leaking out. In addition, in the portion where the luminance is to be increased as in the portion where the image is displayed, the reflective sheet 55 can be attached to the light guide plate 50, thereby increasing the luminance. Accordingly, it is possible to keep the luminance uniform over the entire display apparatus 1.

The foregoing has been shown and described with drawings to specific the embodiments. Although the present disclosure is not limited to the above-described embodiments, those skilled in the art will appreciate that various modifications are possible, without departing from the scope and spirit of the disclosure as disclosed in the accompanying claims.

The invention claimed is:

1. A display apparatus comprising:
   a display panel to display an image;
   a light source configured to supply light to the display panel;
   a light guide plate configured to guide light emitted from the light source;
   a reflective sheet movable between a first state close to a lower surface of the light guide plate and a second state farther away from the lower surface of the light guide plate than the first state; and
   a reflective pattern provided on the reflective sheet and configured to come in contact with the light guide plate in the first state,
   wherein the reflective pattern on the reflective sheet is formed of an acrylate resin including a multi-functional acrylate monomer.

2. The display apparatus of claim 1, wherein the multi-functional acrylate monomer is 3 to 5 wt % based on the total weight of the acrylate resin.

3. The display apparatus of claim 1, wherein the multi-functional acrylate monomer is one element selected from a group consisting of a hydroxyethyl acrylate group, a hydroxyl propyl methacrylate group, and a melamine group.

4. The display apparatus of claim 1, further comprising a reflective sheet driving unit configured to move the reflective sheet from the first state to the second state.

5. The display apparatus of claim 4, wherein the reflective sheet driving unit includes a contact member in contact with the reflective sheet and a moving member configured to move the contact member to move the reflective sheet.

6. The display apparatus of claim 1, wherein a refractive index of the reflective pattern is 1.49.

7. The display apparatus of claim 1, further comprising a backlight unit including the reflective sheet and the light source, and a middle mold configured to support the display panel.

8. The display apparatus of claim 7, wherein the backlight unit further includes a printed circuit board on which the light source is mounted and a plurality of optical sheets disposed on a lower portion of the display panel.

* * * * *